United States Patent
Brück et al.

(10) Patent No.: US 7,651,753 B2
(45) Date of Patent: Jan. 26, 2010

(54) PROCESS AND APPARATUS FOR SPATIALLY INHOMOGENEOUSLY COATING A HONEYCOMB BODY AND INHOMOGENEOUSLY COATED HONEYCOMB BODY

(75) Inventors: Rolf Brück, Bergisch Gladbach (DE); Bodo Odendall, Neuburg (DE); Bernhard Pfalzgraf, Ingolstadt (DE)

(73) Assignees: Emitec Gesellschaft fuer Emissionstechnologie mbH, Lohmar (DE); Audi Aktiengesellschaft, Ingolstadt (DE)

( * ) Notice: Subject to any disclaimer, the term of this patent is extended or adjusted under 35 U.S.C. 154(b) by 813 days.

(21) Appl. No.: 11/029,450

(22) Filed: Jan. 5, 2005

(65) Prior Publication Data
US 2005/0143258 A1    Jun. 30, 2005

Related U.S. Application Data

(63) Continuation of application No. PCT/EP03/06828, filed on Jun. 27, 2003.

(30) Foreign Application Priority Data
Jul. 5, 2002   (DE) .................. 102 30 330

(51) Int. Cl.
| | |
|---|---|
| *B32B 3/12* | (2006.01) |
| *B05D 3/00* | (2006.01) |
| *B05D 5/00* | (2006.01) |
| *B05D 7/14* | (2006.01) |
| *B05D 3/02* | (2006.01) |

(52) U.S. Cl. ............ 428/116; 502/439; 427/287; 427/314; 427/372.2; 427/374.1; 427/398.1

(58) Field of Classification Search .......... 427/246, 427/256, 271, 272, 282, 287, 290, 314, 374.1, 427/398.1; 502/439; 428/116
See application file for complete search history.

(56) References Cited

U.S. PATENT DOCUMENTS

| | | | | | |
|---|---|---|---|---|---|
| 3,160,517 | A | * | 12/1964 | Jenkin ................ | 427/585 |
| 4,177,307 | A | * | 12/1979 | Torii et al. .......... | 428/116 |
| 4,505,221 | A | * | 3/1985 | Falckenberg et al. | 118/101 |
| 4,900,712 | A | * | 2/1990 | Bar-Ilan et al. ..... | 502/304 |
| 5,043,311 | A | * | 8/1991 | Engler et al. ....... | 502/439 |
| 5,393,499 | A | * | 2/1995 | Bagley et al. ...... | 422/174 |
| 5,525,309 | A | * | 6/1996 | Breuer et al. ....... | 422/174 |
| 5,543,181 | A | * | 8/1996 | Fehn et al. ......... | 427/419.2 |

(Continued)

FOREIGN PATENT DOCUMENTS

DE    39 12 915 C1    12/1990

(Continued)

*Primary Examiner*—Timothy C Vanoy
*Assistant Examiner*—Daniel Berns
(74) *Attorney, Agent, or Firm*—Laurence A. Greenberg; Werner H. Stemer; Ralph e. Locher

(57) ABSTRACT

A process for coating a carrier body, in particular a honeycomb body through which a fluid can flow, with a coating material which is applied to the carrier body, provides a spatial temperature distribution of the coating material in the carrier body being inhomogeneous during application and/or after application. A carrier body has a spatially inhomogeneous coating thickness and an apparatus is provided for the inhomogeneous coating of a carrier body. Efficient catalysis is ensured and superfluous coating material is saved at locations where it is not required.

20 Claims, 2 Drawing Sheets

U.S. PATENT DOCUMENTS

| | | | |
|---|---|---|---|
| 5,569,455 A * | 10/1996 | Fukui et al. | 422/174 |
| 5,667,875 A * | 9/1997 | Usui | 428/182 |
| 5,877,107 A * | 3/1999 | Zahn et al. | 502/20 |
| 5,922,299 A * | 7/1999 | Bruinsma et al. | 423/335 |
| 5,996,228 A * | 12/1999 | Shoji et al. | 29/890 |
| 5,997,677 A * | 12/1999 | Zaher | 156/230 |
| 6,544,334 B1 * | 4/2003 | Potyrailo et al. | 506/32 |
| 6,596,056 B2 | 7/2003 | Domesle et al. | |
| 6,710,014 B2 | 3/2004 | Domesle et al. | |
| 2001/0006717 A1 | 7/2001 | Domesle et al. | |
| 2002/0004454 A1 | 1/2002 | Domesle et al. | |
| 2002/0034460 A1 | 3/2002 | Bruck et al. | |
| 2003/0190408 A1 * | 10/2003 | Moini et al. | 427/8 |

FOREIGN PATENT DOCUMENTS

| | | | |
|---|---|---|---|
| DE | 41 35 055 C1 | | 5/1993 |
| DE | 199 12 846 A1 | | 9/2000 |
| DE | 199 62 544 A1 | | 7/2001 |
| DE | 100 24 038 A1 | | 11/2001 |
| JP | 59232339 A | * | 12/1984 |
| JP | 61004536 A | | 1/1986 |
| JP | 61018438 A | | 1/1986 |
| JP | 610045535 A | | 1/1986 |
| JP | 2000202304 A | | 1/2000 |

\* cited by examiner

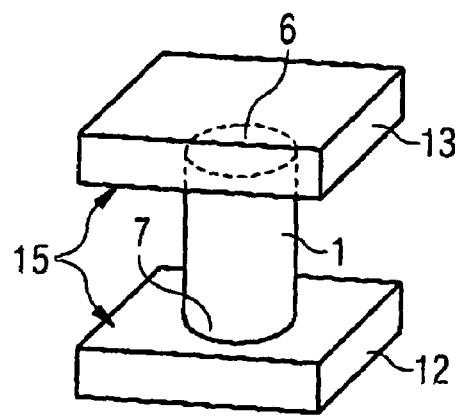
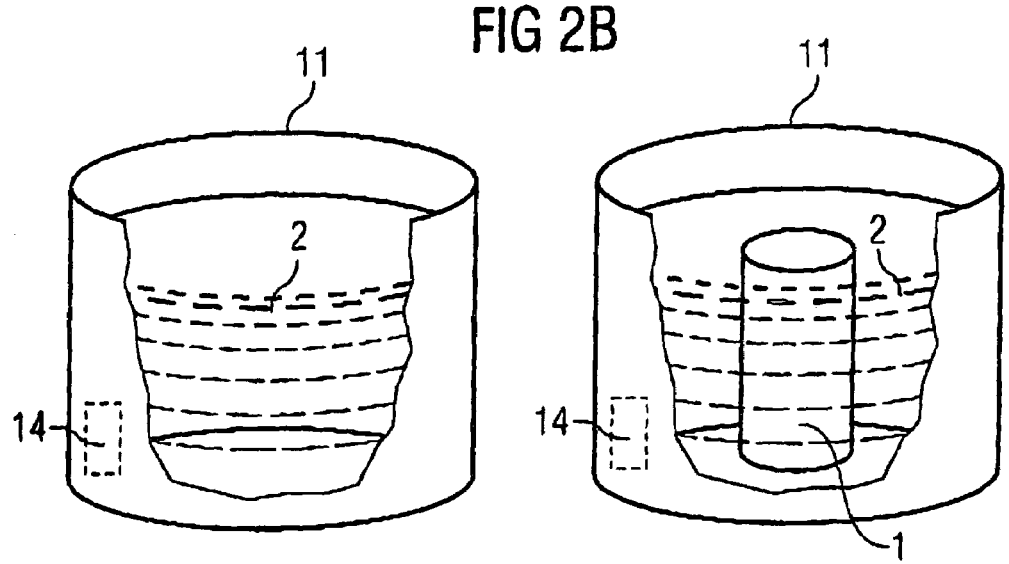

US 7,651,753 B2

PROCESS AND APPARATUS FOR SPATIALLY INHOMOGENEOUSLY COATING A HONEYCOMB BODY AND INHOMOGENEOUSLY COATED HONEYCOMB BODY

CROSS-REFERENCE TO RELATED APPLICATION

This is a continuing application, under 35 U.S.C. § 120, of copending international application No. PCT/EP2003/006828, filed Jun. 27, 2003, which designated the United States; this application also claims the priority, under 35 U.S.C. § 119, of German patent application No. 102 30 330.4, filed Jul. 5, 2002; the prior applications are herewith incorporated by reference in their entirety.

BACKGROUND OF THE INVENTION

Field of the Invention

The invention relates to a process and an apparatus for coating a carrier body, in particular a honeycomb body through which a fluid can flow, as well as a coated honeycomb body. Honeycomb bodies which have been coated in this way are used in particular as catalytic converters for purifying the exhaust gases from internal combustion engines.

Known honeycomb bodies have a large number of substantially parallel passages passing through them and are formed, for example, of a ceramic shaped body. Examples of ceramic materials which can be used include cordierite, mullite or α-aluminum oxide. Extruded carrier bodies are substantially produced from cordierite, although kaolin, aluminum hydroxide, aluminum oxide, talc, carbon particles, etc., can be added to the starting material. Metallic honeycomb bodies which are composed of a multiplicity of partially structured and optionally wound sheet-metal foils are also known.

It is necessary to provide as large a catalytically active contact surface area of the honeycomb body as possible, with regard to achieving highly efficient catalytic conversion of pollutants in the exhaust gas. In particular, the following pollutants are involved in the catalytic conversion: nitrogen oxides, unsaturated hydrocarbons, carbon monoxide, etc. In order to achieve a high efficiency, the honeycomb bodies have very high passage densities. By way of example, metallic honeycomb bodies with a cell density of up to 1500 cpsi (cells per square inch) are known.

The catalytically active surface area is further increased by coating the relatively smooth passage walls with what is known as a washcoat which has a highly fissured surface. That fissured surface on one hand ensures that sufficient space is available for fixing a catalyst (e.g. platinum, rhodium, etc.) and on the other hand offers a large surface area for the catalysis of the exhaust gas flowing through, effecting particularly intensive contact with the catalyst.

It is known to apply the washcoat layer with a large surface area promoting catalysis by immersing the honeycomb body in a liquid washcoat dispersion or spraying with such dispersion. Then, the excess washcoat dispersion is removed, the washcoat in the honeycomb body is dried and finally calcined at temperatures of generally over 450° C. During calcining, the volatile constituents of the washcoat dispersion are expelled, to produce a temperature-resistant catalysis-promoting layer with a high specific surface area. If appropriate, this operation is repeated a number of times in order to achieve a desired layer thickness.

The washcoat usually is formed of a mixture of an aluminum oxide from the transition series and at least one promoter oxide, for example rare earth oxides, zirconium oxide, nickel oxide, iron oxide, germanium oxide and barium oxide.

Heretofore, it was always thought that the washcoat dispersion had to have as uniform flow properties as possible during application to the honeycomb body in order to achieve a desired, uniform layer thickness over the entire passage length. A particularly uniform thickness should be achieved especially for very small passage cross sections, which is the current development trend.

One significant cost factor in catalytic converters, however, is the costs of coating materials, in particular for the catalytically active substances, such as for example precious metals.

SUMMARY OF THE INVENTION

It is accordingly an object of the invention to provide a process and an apparatus for spatially inhomogeneously coating a honeycomb body and an inhomogeneously coated honeycomb body, which overcome the hereinafore-mentioned disadvantages of the heretofore-known processes, apparatuses and products of this general type and with which efficient catalysis of pollutants is ensured and costs are saved.

With the foregoing and other objects in view there is provided, in accordance with the invention, a process for coating a carrier body, in particular a honeycomb body through which a fluid can flow. The process comprises applying a coating material to the carrier body. An inhomogeneous spatial temperature distribution of the coating material is provided in the carrier body during and/or after the applying step.

Further advantageous configurations and refinements, which can in each case be applied individually or can be combined with one another in any desired way, also form the subject matter of the invention.

A spatially inhomogeneous viscosity of the coating material is produced in the carrier body during the coating operation with the aid of the inhomogeneous temperature distribution of the coating material. Since the viscosity of the coating material is dependent on the temperature, the inhomogeneous temperature distribution of the coating material can be used to influence the coating material flowing off the carrier body and therefore to set a varying coating thickness. Therefore, a spatially inhomogeneous temperature distribution leads to a spatially inhomogeneous layer thickness distribution.

With the aid of this process, it is advantageously possible to match the coating thickness to the requirements of the catalysis, in particular its spatial profile. In particular, regions in which the level of catalytic conversion is only lower than in other regions are configured with, in relative terms, less coating material than other regions in which the catalytic conversion predominantly takes place. This reduces the costs of coating material while still ensuring efficient catalytic conversion.

By way of example, a greater coating thickness is selected at the inflow side of the carrier body than at an outflow side, since experience has shown that in percentage terms more pollutants are catalytically converted at the inflow side than at the outflow side. Consequently, a greater layer thickness of the coating material is required at the inflow side than at the outflow side. This saves coating material at the outflow side.

Furthermore, it is possible to select a coating thickness in the interior of the carrier body which decreases from the inside outward in the radial direction. This too ensures complete catalysis in regions with a high catalytic activity with the aid of the greater layer thickness and saves coating material in regions of a low catalytic activity with the aid of a lower coating thickness.

In one mode of the process according to the invention, the spatial temperature distribution is inhomogeneous in an axial direction of the carrier body. A spatial temperature distribution in an axial direction of the carrier body effects a corresponding viscosity distribution in this direction, resulting in a corresponding coating thickness distribution.

It is possible to influence the spatial profile of the catalysis with the aid of a coating thickness which varies in an axial direction of the carrier body. The catalysis can be concentrated or kept away from defined spatial regions. It is also possible to influence the starting characteristics of catalysis by predetermining a spatial profile of the catalysis.

By way of example, concentrating the catalysis on front regions (as seen in the direction of flow of the fluid) of the carrier body causes the majority of the catalysis to take place in only part of the carrier body. This part of the catalytic converter, due to its lower thermal inertia, based on the carrier body as a whole, reaches the light-off temperature required for catalysis to start, since less mass has to be heated to the required light-off temperature. This produces a particularly favorable starting behavior of the catalytic converter.

Regions which lie further downstream, as seen in the direction of flow, ensure complete conversion of the pollutants. These regions are important in particular in the warm state of the catalytic converter. However, they only require a smaller amount of catalytically active material, since the majority of the quantity of pollutants is already converted at the inflow side.

The spatial temperature distribution is advantageously inhomogeneous in a radial direction of the carrier body. This type of inhomogeneity of the layer thickness takes account of the fact that the flow velocities of the fluid that is to be purified (e.g. exhaust gas) are particularly high in the central region of the carrier body, and consequently particularly high levels of pollutants have to be converted in the central regions. A thicker coating in this central region increases the surface area for catalytic conversion and therefore ensures effective catalytic conversion even in these regions of the catalytic converter.

The flow velocities are lower in the edge regions, and lower levels of pollutants have to be converted. In other words, the flow profile of the fluid which is to be purified requires a passage at the edge to convert fewer pollutants than a passage in the center of the catalytic converter, given an identical passage cross section. For this region, the layer thicknesses required in the edge regions are lower. Lower coating thicknesses at the edge save costs for catalytically active materials, such as for example precious metals.

It is advantageous if the temperature difference of the spatially inhomogeneous temperature distribution amounts to at least 2° C., in particular at least 5° C. However, at least 15° C. is particularly preferred, with the result that the differences in viscosity are particularly pronounced due to the differing temperature. Viscosity differences in a liquid coating material of at least 1%, in particular of at least 3%, preferably of at least 10%, advantageously occur.

The temperature difference within the inhomogeneous temperature distribution can be effected by local cooling and/or local heating of the carrier body. By way of example, the carrier body can be locally cooled through contact with a heat sink. Alternatively, the carrier body is locally heated with the aid of an infrared lamp or through contact with a heater body.

The temperature difference of the inhomogeneous temperature distribution in the coating material may also be effected by local cooling and/or local heating of the coating material. In this variant, the inhomogeneous temperature distribution is not effected through heat transfer from the carrier body to the coating material, but rather by direct local cooling or local heating of the coating material.

This can be effected, for example, with the aid of an infrared lamp or by setting or stipulating a spatial temperature inhomogeneity in the coating material before it is applied to the carrier body. By way of example, a central region of the carrier body is sprayed with coating material at a lower temperature than a region located further toward the outside.

It is advantageous for the coating material and/or the carrier body to be heated and/or cooled at various locations. By way of example, the carrier body can be held between a heater body and a heat sink, so that a temperature gradient is formed in the carrier body between the contact surfaces of the respective heater body or heat sink.

It is possible to accurately predetermine the temperature distribution of the coating material in the carrier body within broad limits by setting or stipulating a plurality of heating or refrigeration sources. In particular, this makes it possible to set a varying layer thickness which allows efficient catalysis and, at the same time, reduces the costs of the coating material required.

In a further mode of the process according to the invention, the carrier body, prior to the application of the coating material, is at a temperature which is different than the temperature of the coating material. The heat capacity of the carrier body and the heat or refrigeration transfer from the carrier body to the coating material, produce an inhomogeneous temperature distribution in the coating material.

The temperature difference between the carrier body and the coating material alone ensures that the coating material is heated (cooled) as it flows through the carrier body, resulting in an inhomogeneous temperature distribution. Alternatively, the carrier body has a spatially inhomogeneous temperature distribution in its interior before the coating material is applied.

The spatially inhomogeneous temperature distribution in the coating material can be effected by a temperature difference between the coating material and the carrier body before the coating material is applied, by a spatial temperature distribution in the carrier body before the coating material is applied, by local heating/cooling while the coating material is being applied, or by a spatial inhomogeneity in the coating material before it is applied. It is possible to vary or predetermine a spatial temperature distribution of the coating material and/or a spatial distribution of the coating thicknesses within wide limits, by combining these two options.

The carrier body is advantageously locally heated by electromagnetic radiation, in particular induction or microwaves. Local induction makes it possible to achieve a spatially inhomogeneous temperature distribution of the coating material by the carrier body being heated either before or during application of the coating material.

It is advantageous for the carrier body to be heated by local heat contact and/or cooled by local refrigeration contact. Alternatively, the carrier body and/or the coating material is/are locally heated or cooled with the aid of a stream of fluid. In the event of heat transfer with the aid of a stream of fluid, thermal convection as well as thermal contact plays a considerable role. Furthermore, the carrier body and/or the coating material can be locally heated or cooled with the aid of an infrared lamp, in particular by thermal radiation.

It is possible to accurately predetermine the inhomogeneous temperature distribution in the coating material and therefore the varying coating thickness by providing a plurality of heat sinks or heat sources, if appropriate at various locations.

In one specific configuration of the process according to the invention, the coating material is applied in liquid form, in particular as a suspension. The coating material may, for example, be applied with the aid of an immersion bath or sprayed on.

The coating material used is advantageously a washcoat. The washcoat is advantageously formed of a mixture of an aluminum oxide from the transition series and at least one promoter oxide, such as for example rare earth oxides, zirconium oxide, nickel oxide, iron oxide, germanium oxide and barium oxide. Washcoats of this type offer a fissured surface, which on one hand offers sufficient space to fix a catalyst and on the other hand serves to improve the mass transfer through diffusion in the exhaust gas flowing through. The coating material advantageously includes catalytically active substances (e.g. platinum, rhodium, etc.), in particular precious metals.

With the objects of the invention in view, there is also provided a carrier body, comprising an inlet side, an outlet side, an inner region, an outer region, and passages through which a fluid can flow. A coating material coats the passages with a coating thickness, in particular by using the process described above. The coating thickness is different at respective passages and/or the coating thickness varies along the passages.

This inhomogeneous coating thickness takes into account the spatial profile of the catalytic conversion and in particular ensures that sufficient coating material is present in regions with a high catalytic activity and excess coating material is saved in regions with a lower catalytic activity. Therefore, contrary to previous expertise, the coating material is not made particularly uniform, in order to thereby achieve a particularly tailor-made coating which is matched to the catalytic reaction that actually takes place. This on one hand ensures highly efficient catalytic conversion and on the other hand saves on excess, expensive coating material.

The coating thickness may vary from passage to passage, and in particular may be thicker in a center of the carrier body than in regions located further outward. By way of example, the coating thickness decreases in the radially outward direction from the center of the carrier body.

However, the coating thickness may also vary along the passages, in which case the coating thickness preferably decreases substantially in the direction of flow.

The coating thickness advantageously decreases along the passages from the inlet side of the carrier body toward the outlet side. This concentrates catalytic conversion on the front region of the carrier body, while particularly complete catalytic conversion is ensured by the downstream region of the carrier body.

The coating thickness advantageously decreases from passage to passage from the inner region toward the outer region. This takes into account the flow profile of the fluid that is to be purified, and coating material is applied with a thickness which corresponds to the prevailing catalytic conversion rate. In the outer regions, where less fluid is flowing and therefore a lower catalytic activity is to be expected, superfluous coating material is saved.

The coating thickness advantageously decreases substantially linearly. A linear spatial coating thickness profile can be predetermined by simple measures for setting or stipulating corresponding refrigeration and/or heat sources. Furthermore, it is advantageous for the coating thickness to decrease substantially exponentially. An exponential profile saves particularly large amounts of coating material.

In this case, the spatial profile of the coating thickness may be different in different spatial directions. By way of example, the coating thickness may decrease exponentially along the passages and may decrease linearly in the radial direction from the inside outward, or vice versa.

It is advantageous for the coating thickness to decrease by at least 10%, preferably by at least 30%, particularly preferably by at least 80%. It can be seen from these numbers that it is possible to save at least 5% up to at least 40% of the coating material, in particular expensive catalytically active substances, such as precious metals, with the aid of the invention.

With the objects of the invention in view, there is additionally provided an apparatus for coating a carrier body, in particular as described above, with a coating material, preferably using the process described above. The apparatus comprises an applicator for applying the coating material to the carrier body. At least one temperature-setting or adjusting device produces a spatially inhomogeneous temperature distribution of the coating material before or during application of the coating material.

The applicator may, for example, be an immersion bath or a nozzle for spraying on the coating material. The temperature-setting device is, for example, a heat or refrigeration or cooling source in the form of a heat sink or heater body or a heat lamp or an induction heater. The carrier body is locally heated or cooled with the aid of thermal conduction, thermal convection and/or thermal radiation, so that it is possible to produce a spatially inhomogeneous temperature profile of the coating. With the aid of this apparatus, the coating thickness of the coating material on the carrier body is set in a controlled way. By way of example, particularly large amounts of coating are provided in regions with a high catalytic activity, in particular at the inflow side of the carrier body or in an inner region of the carrier body.

In accordance with a concomitant feature of the apparatus according to the invention, there are at least two temperature-setting devices for producing a spatially inhomogeneous temperature distribution in the carrier body. A particularly steep temperature gradient can be produced by at least two temperature-setting devices, with the result that the coating thickness can be varied particularly extensively.

Other features which are considered as characteristic for the invention are set forth in the appended claims.

Although the invention is illustrated and described herein as embodied in a process and an apparatus for spatially inhomogeneously coating a honeycomb body and an inhomogeneously coated honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2A and 2B are perspective views depicting two steps of a process according to the invention for coating a honeycomb body.

DESCRIPTION OF THE PREFERRED EMBODIMENTS

Figure 1A:
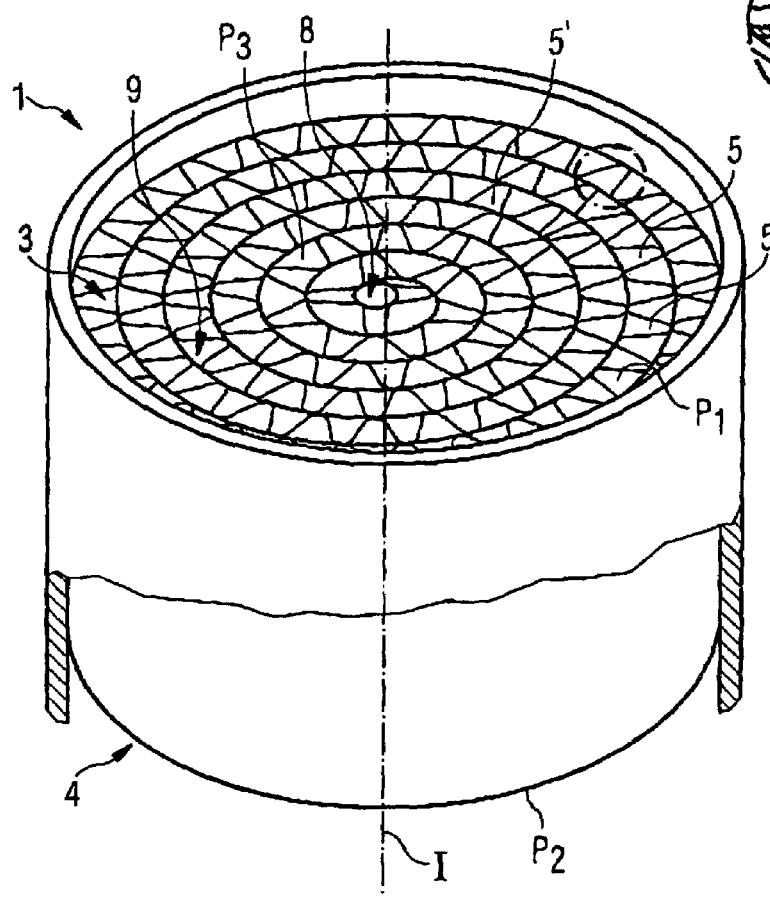
FIG. 1A is a fragmentary, diagrammatic, partly broken-away, perspective view of a honeycomb body according to the invention.

Referring now to the figures of the drawings in detail and first, particularly, to FIG. 1A thereof, there is seen a catalyst carrier body 1 according to the invention, which is constructed as a catalytic honeycomb body. The carrier body 1 has been formed by stacking or layering smooth and corrugated layers of sheet metal. The carrier body 1 has an inner region 8 and an outer region 9 and/or an inlet side 3 and an outlet side 4. The inlet side 3 serves as an inflow side for fluid. Passages 5, 5' through which a fluid can flow are disposed between the inlet side 3 and the outlet side 4. The fluid flows through the passages 5, 5' substantially along a direction I.

Figure 1B:
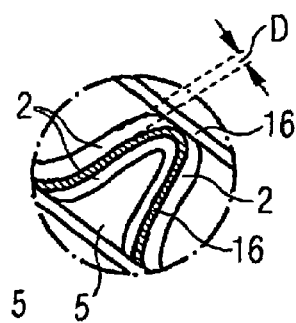
FIG. 1B is an enlarged plan view of a portion of FIG. 1A enclosed by a dot-dash circle.

As is seen in FIG. 1B, the passages 5, 5' are formed by metal sheets or sheet metal layers 16 which are covered or coated with a coating material 2 of varying coating thickness D. The coating thickness D decreases along the flow passages from the inlet side 3 toward the outlet side 4, with an exponential profile being preferred. The coating thickness D also decreases radially outwardly from the inner region 8 toward the outer region 9. In this case, a substantially linear profile is advantageously selected. This means that the coating thickness D is thicker at a first location P1 than at a second location P2 but not as thick as at a third location P3.

FIGS. 2A and 2B illustrate a process according to the invention for coating a carrier body 1 with a coating material 2 which is applied to the carrier body 1 using an applicator 11 configured as an immersion bath. For this purpose, the carrier body 1 is clamped between a first temperature-setting device 12 and a second temperature-setting device 13. In this way, heat is transferred from the second temperature-setting device 13 to the carrier body 1 through a heat contact 6 between the carrier body 1 and the second temperature-setting device 13, which is configured as a heater body. Refrigeration or cooling is transferred from the first temperature-setting device 12 to the carrier body 1 through a refrigeration or cooling contact 7 between the carrier body 1 and the first temperature-setting device 12. The temperature difference between the two temperature-setting devices is advantageously 5° C.

An inhomogeneous temperature distribution of the carrier body 1 along the direction I of the passages 5 is induced with the aid of the two temperature-setting devices. The applicator 11 is a bath containing coating material 2, which has been brought to a predetermined temperature with the aid of a third temperature-setting device 14. Then, the carrier body 1 is immersed in the coating material 2 (see FIG. 2B), so that coating material 2 penetrates into the passages 5 of the carrier body 1. Finally, the carrier body 1 is pulled out the bath.

The inhomogeneous temperature profile in the carrier body 1 prior to immersion and the temperature of the third temperature-setting device 14 accurately set the spatial profile of the coating thickness D. In particular, therefore, a correspondingly inhomogeneous temperature distribution is produced on the carrier body 1 and effects a corresponding viscosity of the coating material 2.

As a result of the carrier body being pulled quickly out of the applicator 11, which is constructed as an immersion bath, the coating material 2 flows at correspondingly different speeds at different spatial locations P1, P2, P3 in accordance with the viscosity and thereby forms a spatially inhomogeneous coating thickness D.

The invention therefore provides a process for coating a carrier body 1, in particular a honeycomb body through which a fluid can flow, with a coating material 2 that is applied to the carrier body 1. In that process, the spatial temperature distribution of the coating material 2 in the carrier body 1 is inhomogeneous during application and/or after application. The invention also provides a carrier body having a spatially inhomogeneous coating thickness as well as an apparatus for the homogeneous coating of a carrier body 1.

The invention is distinguished by the fact that efficient catalysis is ensured and superfluous coating material is saved at locations where it is not required.

What is claimed is:

1. A process for coating a carrier body, which process comprises the following steps:
    applying a coating material to the carrier body, the carrier body being a honeycomb body through which a fluid can flow and which is a catalytic converter for purifying exhaust gasses of an internal combustion engine; and
    providing an inhomogeneous spatial temperature distribution of the coating material in the carrier body during and/or after the applying step, resulting in a spatially inhomogeneous coating thickness distribution in the carrier body, the temperature distribution being provided with a temperature difference of at least 2° C.

2. The process according to claim 1, which further comprises making the spatial temperature distribution inhomogeneous in an axial direction of the carrier body.

3. The process according to claim 1, which further comprises making the spatial temperature distribution inhomogeneous in a radial direction of the carrier body.

4. The process according to claim 1, which further comprises providing a temperature difference in the temperature distribution by at least one of local cooling and local heating of the carrier body.

5. The process according to claim 1, which further comprises providing a temperature difference in the temperature distribution by at least one of local cooling and local heating of the coating material.

6. The process according to claim 1, which further comprises at least one of heating and cooling at least one of the coating material and the carrier body at various locations.

7. The process according to claim 1, which further comprises locally heating the carrier body by electromagnetic radiation.

8. The process according to claim 1, which further comprises locally heating the carrier body by electromagnetic induction or microwaves.

9. The process according to claim 1, which further comprises locally heating at least one of the carrier body and the coating material by thermal radiation.

10. The process according to claim 1, which further comprises at least one of heating the carrier body by local heat contact and cooling the carrier body by local refrigeration contact.

11. The process according to claim 1, which further comprises locally heating or cooling at least one of the carrier body and the coating material with a stream of fluid.

12. The process according to claim 1, which further comprises carrying out the applying step by applying the coating material in liquid form.

13. The process according to claim 1, which further comprises carrying out the applying step by applying the coating material as a suspension.

14. The process according to claim 1, which further comprises carrying out the applying step by applying a washcoat as the coating material.

15. The process according to claim 1, wherein the coating material includes catalytically active substances.

16. The process according to claim 1, wherein the coating material includes precious metals.

17. A process for coating a carrier body, which process comprises the following steps:
- applying a coating material to the carrier body, the carrier body being a honeycomb body through which a fluid can flow and which is a catalytic converter for purifying exhaust gasses of an internal combustion engine;
- providing an inhomogeneous spatial temperature distribution of the coating material in the carrier body during and/or after the applying step, resulting in a spatially inhomogeneous coating thickness distribution in the carrier body; and
- placing the carrier body, prior to the step of applying the coating material, at a temperature different than a temperature of the coating material.

18. The process according to claim 17, which further comprises providing a temperature difference of at least 5° C. in the temperature distribution.

19. The process according to claim 17, which further comprises providing a temperature difference of at least 15° C. in the temperature distribution.

20. A process for coating a carrier body, which process comprises the following steps:
- applying a coating material to the carrier body, the carrier body being a honeycomb body through which a fluid can flow and which is a catalytic converter for purifying exhaust gasses of an internal combustion engine;
- providing an inhomogeneous spatial temperature distribution of the coating material in the carrier body during and/or after the applying step, resulting in a spatially inhomogeneous coating thickness distribution in the carrier body; and
- providing the carrier body with a spatially inhomogeneous temperature distribution before the step of applying the coating material.

* * * * *